US007930214B2

(12) United States Patent
Knauerhase et al.

(10) Patent No.: US 7,930,214 B2
(45) Date of Patent: Apr. 19, 2011

(54) MANAGEMENT AND ARBITRATION OF MOBILE SERVICE DISCOVERY

(75) Inventors: Robert C. Knauerhase, Portland, OR (US); Scott H. Robinson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1196 days.

(21) Appl. No.: 10/430,031

(22) Filed: May 5, 2003

(65) Prior Publication Data

US 2004/0236633 A1 Nov. 25, 2004

(51) Int. Cl.
*G06Q 10/00* (2006.01)
(52) U.S. Cl. .......................... 705/26; 455/3.01
(58) Field of Classification Search ............ 705/26, 705/27, 5, 6, 13, 400–499; 709/230–237
See application file for complete search history.

(56) References Cited

U.S. PATENT DOCUMENTS

| | | | | |
|---|---|---|---|---|
| 5,946,618 A * | 8/1999 | Agre et al. | ..................... | 455/428 |
| 2001/0049632 A1 * | 12/2001 | Rigole | ............................. | 705/26 |
| 2001/0049638 A1 * | 12/2001 | Satoh | ............................. | 705/26 |
| 2002/0143819 A1 * | 10/2002 | Han et al. | ...................... | 707/513 |
| 2003/0065805 A1 * | 4/2003 | Barnes, Jr. | .................... | 709/231 |

OTHER PUBLICATIONS

Motter, Paul; "Uscomix," May 1997, Upside, 9, 5; p. 90, 9pp.*

* cited by examiner

*Primary Examiner* — Adam Levine
(74) *Attorney, Agent, or Firm* — Schwabe, Williamson & Wyatt, P.C.

(57) ABSTRACT

A Registry, such as a UDDI registry, dynamically manages (e.g. filters and/or re-orders) answers to service queries by Service Consumers based at least on one or more of the individual states/status of Service Providers, the collective service environment state, and policies employed by the environment. The Registry may be configured to infer operational state/status about a Service Provider, such as impending unavailability due to very low battery reserves, and to remove providers from the registry if determined to be unavailable. The Registry may be configured to associate a shelf-life with a provider registration based on characteristics of the Service Provider, or based on past experience with the Service Provider. Such dynamic management allows the Registry to implement intelligent task distribution and load balancing between Service Providers, and to insulate Service Providers on fragile platforms (e.g. notebooks, handhelds, etc.) that may otherwise be overwhelmed by offering themselves as a traditional provider.

11 Claims, 5 Drawing Sheets

MANAGEMENT AND ARBITRATION OF MOBILE SERVICE DISCOVERY

Related Application Data

This application claims priority based on U.S. Provisional Application Ser. No. 60/466,927 entitled "MANAGEMENT AND ARBITRATION OF MOBILE SERVICE

FIELD OF THE INVENTION

The invention generally relates to service registries, and more particularly to filtering and/or re-ordering responses to service queries based on service provider status and/or characteristics.

BACKGROUND

A network, which may include wired and/or wireless intranets, the Internet, wide area networks (WANs), local area networks (LANs), etc., may have many attached devices offering and/or seeking services, capabilities and/or resources of other devices. It is often difficult to locate devices offering particular services. To facilitate locating devices and their services, various services (and associated protocols) have been implemented. "Web services" or "directory services" are two well-known examples of location services.

The term "web service" denotes a standardized way of describing, discovering, and integrating network applications, services and resources from different businesses using open standards, such as World Wide Web Consortium (W3C) and Internet Engineering Task Force (IETF) standards, including XML (Extensible Markup Language), SOAP (Simple Object Access Protocol), WSDL (Web Services Description Language), UDDI (Universal Description, Discovery and Integration), etc., over a network. Web services are self-contained modular applications that may communicate directly with other web services, applications, or system software.

UDDI is an industry initiative utilizing a platform-independent open framework for a global set of registries allowing businesses to define their services, discover other businesses and services, and to share information about how the business interacts. While UDDI's global nature provides a single source for locating offered services, UDDI unfortunately lacks the ability to automatically identify and remove stale entries. UDDI allows a device to easily register itself and advertise offered or desired services, capabilities and resources, but UDDI expects the device to behave well and remove its data from the database when the services are no longer offered. Unfortunately, if a device suddenly becomes unavailable, stale registry entries may remain associated with the device.

Consequently, traditional registry environments are especially not suitable for transitory devices that may offer and/or use services but that are not intended to have a long-term connection to a particular network environment.

BRIEF DESCRIPTION OF THE DRAWINGS

The features and advantages of the present invention will become apparent from the following detailed description of the present invention in which.

DETAILED DESCRIPTION

A registry facilitates advertising, discovering, and providing/using services and resources (collectively referenced hereafter as a "registration"). Since resources may be encapsulated and advertised and used as services, unless indicated otherwise directly or by context, the term "services" is intended to include "resources". In the illustrated embodiments, there may be many registries on a network, where some registries are kept fully in sync (i.e. coherent) with other registries, while other registries may elect to keep some registrations private. The invention may be utilized with various directory services, web services, UDDI registries, Microsoft Corporation's .NET services, and the like. In the claims, the term "registry" is intended to generally reference these various registries possibilities and equivalents thereto. However, for expository convenience, the following detailed description focuses on UDDI registries. It will be appreciated by one skilled in the art, that as times change, alternate registries or services will arise, and that the teachings herein are applicable thereto.

In a network environment, for various reasons, devices may suddenly appear, disappear, and reappear on the network. Such devices are referenced herein and the claims that follow as "transitory devices." The phrase "transitory device" is intended to broadly encompass both physically distinct machines, such as conventional portable or mobile computers, personal digital assistants (PDAs), embedded computers in transportation devices, as well as a logical or virtual devices, such as a hardware processor emulation, software machine emulation, or virtual machine (VM) (since VMs may be arbitrarily created, suspended or destroyed). The following description focuses on the interaction between transitory devices and registries, such as a UDDI registry. It will be appreciated by one skilled in the art that the following description applies to many other machine types and registry environments.

Figure 1:
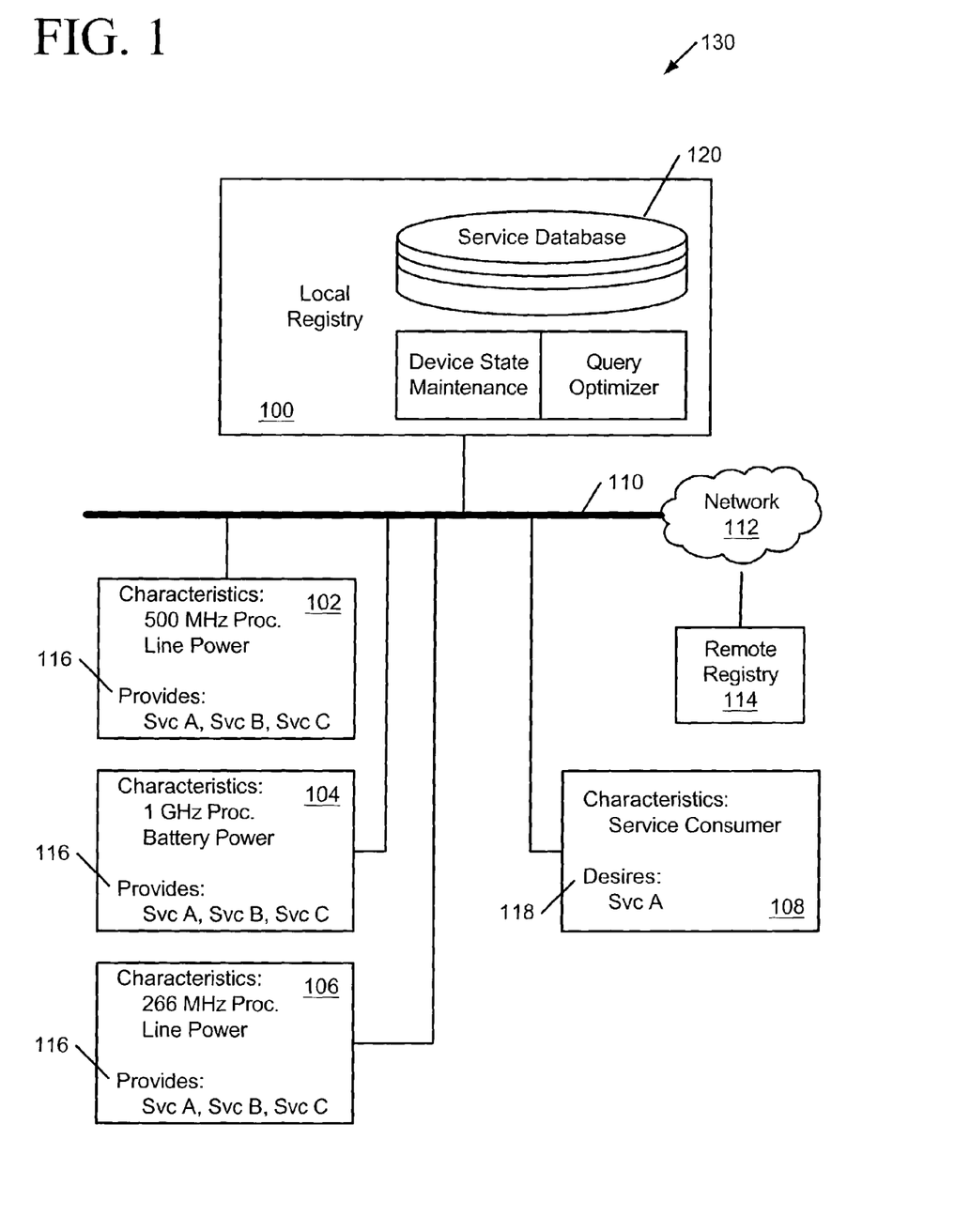
FIG. 1 illustrates an exemplary system according to one embodiment.

FIG. 1 illustrates an exemplary system 130 according to one embodiment. Illustrated are a local Service Registry 100, Service Providers 102-106, and Service Consumer 108. The Service Registry, Service Providers and Service Consumer are communicatively coupled by an environment 110, such as a local network, which as will be appreciated by one skilled in the art, may comprise wired and/or wireless portions. The Service Registry, while centralized for a particular environment, may itself be ephemeral, e.g., it may be a temporary registry elected in an ad-hoc fashion from among multiple devices capable of providing registry service to the environment.

The communication path 110 may in turn be coupled with a network 112, such as the Internet or other network, to which may be attached a Remote Registry 114, such as the Microsoft Corporation UDDI server. Note that although the Service Registry 100 is shown separately from other network devices, e.g., Service Providers 102-106, Service Consumer 108, etc., it may be incorporated into one of the network devices, whether physical or virtual. It will be further appreciated that, in addition to the local 100 and remote 114 registries, there may be many other registries (not illustrated) distributed across public and private networks, each storing service registration data for local and/or remote devices.

These multiple registries may be kept in sync so that one may register with one registry and later retrieve registration data from another registry. Alternatively, some registries, such as the Service Registry 100, may elect to keep some or all of their registrations private from other registries such as the Remote Registry 114. For example, assuming communication path 110 is a private local network, such as an intranet, not generally accessible by the network 112, if it is known that devices on the local network are primarily transitory devices, it may be helpful to limit registrations of such devices to the Service Registry 100 so as to not unnecessarily propagate transitory registrations to the Remote Registry 114. Often private networks will host private services that should not be advertised to or accessed by entities outside of that network domain. Such is the case for many corporate enterprises and small office, home office network configurations. In one embodiment one or more registries may federate to operate as a single logical registry. In such a case, some registry entries may be duplicated, such as for efficiency purposes, while others only reside in a single registry. For example, duplicated entries might correspond to frequently used services that persist on the network. Transient or infrequently used services might only reside in specific registries.

As would a conventional registry, the Service Registry 100 tracks services offered or desired by machines in the network environment 110. However, in the illustrated embodiment, the Service Registry operates by dynamically managing (e.g. filters and/or re-orders) answers to service queries by Service Consumers based at least on one or more of the meta-data describing the individual states/status of Service Providers, the collective service environment state, and policies employed for the environment. The Service Registry may inspect service providers of the local environment, e.g., query Service Providers 102-106 for the meta-data, or the meta-data may be provided/pushed by the Service Providers to the Service Registry, or inferred by the Service Registry.

Meta-data may include information about the Service Providers and their capabilities, including, for example, available power (e.g., battery time remaining, "infinite" power available if plugged in), processing power, processing availability (load), processor platform, available main memory, network availability (e.g., available bandwidth on various networks available to the Service Provider), LRU (Least Recently Used) status (to prevent same machine being selected again and again), hardware/software platform configuration(s), security and/or certificates (e.g. proving identity or group membership such as devices from a given company), reputation, quality-of-service (QoS), etc. It will be appreciated that these are only exemplary characteristics that may be of interest in determining whether to suggest a particular provider in response to a service request from a Service Consumer 108. Meta-data may also include processing characteristics, requirements and/or costs associated with services provided by the Service Providers 102-106. Service Consumer 108 may also provide query metadata or parameters indicating, but not limited to, required quality of service, cost restrictions, security, service-level agreements, etc. indicating required and/or desired Service Provider meta-data characteristics.

Figure 2:
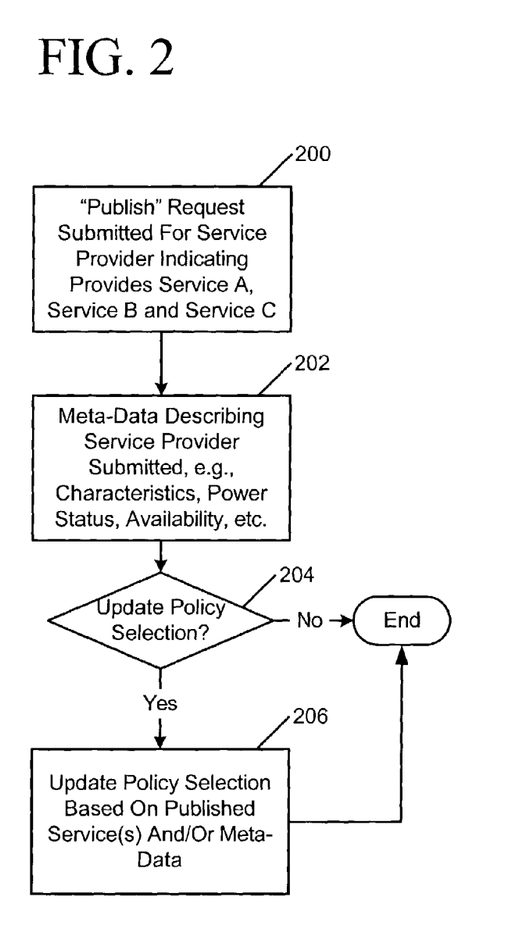
FIG. 2 illustrates a flowchart according to one embodiment of Service Providers registering with a Service Registry.
Figure 3:
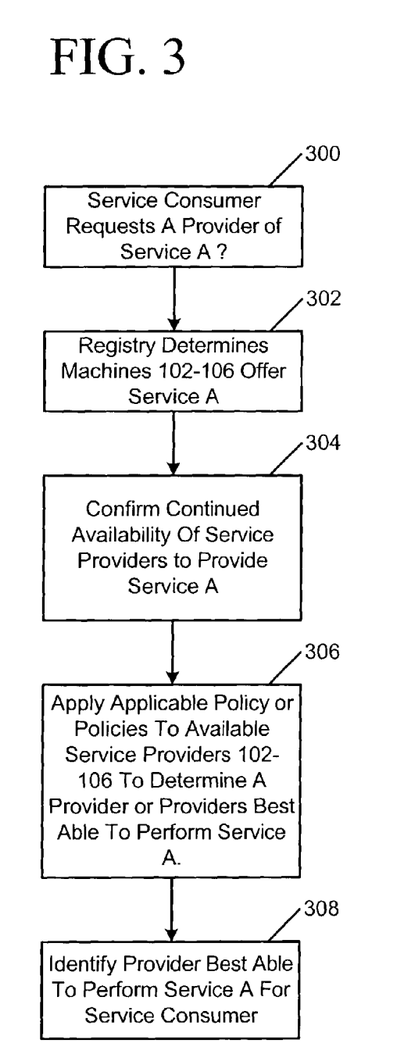
FIG. 3 illustrates a flowchart according to one embodiment of a Service Consumer requesting the Service Registry to identify a service provider offering a service.

FIG. 2 and FIG. 3 illustrate flowcharts according to one exemplary embodiment of FIG. 1. FIG. 2 illustrates Service Providers 102-106 registering their services with Service Registry 100. The illustrated embodiments are assumed applied in a networked environment 110 comprising mobile devices such as portable computers, handheld devices, etc., but it will be appreciated the illustrated principles may be applied to traditional service providers.

Assume the Service Registry is disposed in an 802.11 access point (not illustrated), Service Provider 102 is a notebook computer with a 500 MHz Mobile Intel® Pentium® III processor-M operating on line (plugged-in) power, Service Provider 104 is a notebook computer with a 1 GHz Mobile Intel® Pentium® 4 processor-M and operating on batteries with a 30% lifetime remaining, and Service Provider 106 is a Intel® PCA applications processor-based handheld device (Intel® Personal Internet Client Architecture) utilizing a 266 MHz Intel® XScale™ processor. Each Service Provider provides 116 Services ("Svc.") A, B, and C to at least devices of the environment 110. A Service Consumer 108 desires 118 Service A. It will be appreciated by one skilled in the art that each Service Provider 102-106 may offer other services, some of which may be unique to a given provider. In this example, but not by way of restriction, they all are shown to be offering the same Services A, B, and C 116.

With current service registries, when a request is received from a service consumer, the service registry applies a simplistic scheme to identify an available service provider, e.g., the service registry applies a first available, round-robin, or other simple approach to identify a service provider to the requesting service consumer. In particular, these simple schemes do not take characteristics of the service desired or of the service provider into account when the service registry responds to the request with the identity of a service provider. Thus, all devices are considered equal, even though, in the case of portable devices, hand held devices, and the like, this is not the case.

To facilitate intelligent assigning of service requests to service providers, in the illustrated embodiment, when the Service Providers 102-106 publish 200 their offered services into the Service Registry 100, they also provide 202 the Service Registry with meta-data (discussed above) about each provider's capabilities and state. When services are requested (see FIG. 3), the Service Registry may apply one or more policies in deciding which Service Provider (or Providers if the registry and Service Consumer are configured to handle request results identifying multiple providers).

That is, the Service Registry may have different policies that are applied based on, for example, characteristics of the environment 110, of currently available Service Providers 102-106, of the requesting Service Consumer (e.g., to prevent a certain provider from overwhelming the consumer), of the requested service (tough service requires substantial provider resources), service-level agreements (SLA's) (e.g. tiered SLA's such as basic, bronze, silver, gold levels of service), etc. The following table identifies several exemplary policies; it will be appreciated that these policies are simplistic and more complex rules may be defined that take into account several different factors including the environment, consumer, provider, desired service, etc.

| Policy # | Policy Rule |
| --- | --- |
| 1 | choose provider with most energy (e.g. battery life) available |
| 2 | choose provider with fastest processor(s) |
| 3 | choose provider with most available processor(s) or time slices (least load) |
| 4 | choose provider with most available network bandwidth |

-continued

| Policy # | Policy Rule |
|---|---|
| 5 | choose least recently used provider |
| 6 | choose the cheapest service provider |
| 7 | choose the provider based on historical data, e.g., past reliability, reputation, etc. |
| 8 | choose the provider with most available storage |
| 9 | choose provider with most available main memory |
| 10 | choose provider having compatible software/hardware platform |
| 11 | choose provider based on service-level agreements (Quality of Serviced (QoS) guarantees) |
| 12 | choose provider offering best security |
| 13 | choose provider with similar group/entity credentials (e.g. another device from same household, business/company |

It is assumed that the Service Registry by default applied Policy #1 (most energy available). However, if the Service Registry 100 has knowledge of the type of service (either by global service type, or from meta-data provided by a Service Provider 102-106 when publishing 200, 202 its service, the registry may tailor the policy applied to a particular service request. For example, a Service Consumer 108 request for a storage service may result in applying above Policy # 8 and preferentially return the largest-capacity disk device regardless of the power state of the provider, e.g., battery-powered Service Provider 104 may have the largest capacity. Or, if a service request is for a service that works better in the presence of a certain hardware feature (e.g. instruction-set architecture), the Service Registry may return a list of devices of platforms incorporating that feature. Or, if the Service Providers have associated costs with their published services, the Service Registry may apply Policy #6 and resolve a service request based on monetary cost metrics.

However, since as noted above, the particular policy selected in response to a service request may be selected based at least in part on characteristics of the available Service Providers 102-106, after a provider publishes 200, 202 its services, the Service Registry may then determine if 204 a policy selection update is required. For example, if we assume that at a certain point in time only Service Provider 104 (1 GHz processor, battery power) and Service Provider 106 (266 MHz processor, battery power) have published their services to the Service Registry 100, the Service Registry may elect to apply Policy #2 (fastest processor(s)) in selecting a Service Provider for a request. However, when Service Provider 102 (500 MHz processor, line power) publishes its services with the Service Registry, the registry may update 206 its policy selection mechanism to now apply Policy #1 (most energy available) since all other providers are operating on battery power and hence the device having line power may be deemed the most reliable to perform the service. In one embodiment, Service Provider devices 102-106 may dynamically alter the services they offer and the governing policies. These updates are sent to the Service Registry 100 and, as described above, can cause subsequent changes in the policy selection.

FIG. 3 illustrates a flowchart according to one embodiment of a Service Consumer requesting 300 the Service Registry 100 to identify a service provider offering "Service A." The Service Registry determines 302 providers known to the registry to offer Service A, e.g., each of the Service Providers 102-106 offer Service A. In contrast with a typical registry service, after identifying providers of Service A, rather than applying a simplistic provider selection algorithm, e.g., first available, etc., instead the Service Registry may act to determine a provider best able to satisfy the request.

In one embodiment, the Service Registry 100 optionally first confirms 304 continued availability (see also FIG. 4), willingness, etc. of the Service Providers 102-106 to perform the requested service. For example, a provider may have published its provided services when relatively idle, and then become busy when a service request was made and hence the provider may currently be unwilling to tax its resources. (This lets the provider exercise local autonomy with respect to the use of its computing resources.) In one embodiment, confirmation 304 is made by the provider indicating to the registry it is unavailable; in another embodiment, the Service Registry may infer unavailability by its obtaining updated meta-data for the provider that includes an indication of the provider's current high processing load.) In one embodiment, the Service Registry might obtain information about the provider device directly, through a virtual machine monitor (VMM) in the case where the device is implemented as a virtual machine (VM), or through other proxy/management partitions or devices (e.g. separate devices used to monitor and manage mainframe or server systems.)

Assuming continued availability, willingness, etc. of the providers (of if the confirmation 304 is not performed), the Service Registry then applies 306 an applicable policy or possibly multiple policies to the request to determine 308 a provider best able to satisfy the request. For example, assuming the single Policy #1 (most energy available) was being applied (a very useful policy when some but not all providers are battery powered), the Service Registry would respond to the service request with an identification of Service Provider 102. In one embodiment, registries are configured to provide compound results identifying multiple providers, e.g., the Service Registry may provide an ordered list of available providers and their relative ranking.

As will be appreciated by one skilled in the art, the FIG. 2 and FIG. 3 embodiments are helpful even with the most basic of meta-data and policy rules. If more detailed meta-data is provided, such as detailed information about the service, provider, provider's state, anticipation of provider departure (or power-down) from the environment 110, provider's interest in providing service, etc., then assignment of service requests to providers may be further improved in accord with the principles discussed above. Illustrated embodiments improve over conventional web-service providers that simply offering a lookup service of providers matching a service request where results are irrespective of the state of the service. Unlike the illustrated Service Registry 100, traditional registries do not accommodate mobile service providers that may come and go dynamically, and that may prefer to be "secondary" servers to a more appropriate alternate resource provider in the environment 110.

Figure 4:
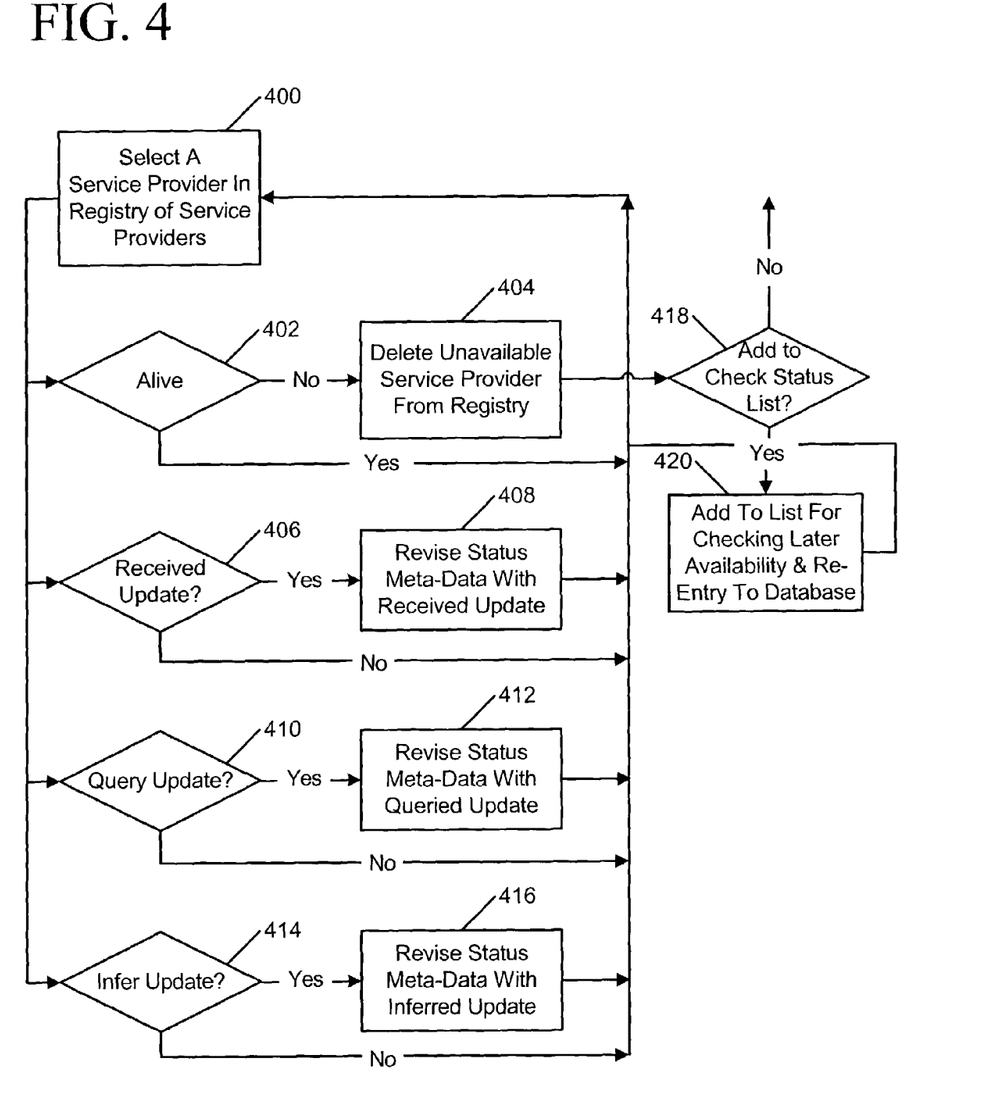
FIG. 4 illustrates a flowchart according to one embodiment for confirming continued availability of a service provider.

FIG. 4 illustrates a flowchart according to one embodiment for confirming continued availability of a service provider. The illustrated embodiment is assumed applied in an environment 110 comprising mobile devices, but it will be appreciated the illustrated principles may be applied to traditional service providers.

In the illustrated embodiment, it is assumed the Service Registry operates a "watcher" service that monitors the status of Service Providers and that identifies status changes. It is assumed the watcher service operates asynchronously to other operations of the Service Registry, e.g., as a separate processing thread. However, as illustrated in FIG. 3, an availability check may be performed by the Service Registry in conjunction with the registry identifying a particular provider to a Service Consumer. For example, a provider may have become too busy to process a service request, or, for example, the provider may have entered into a low-power state (and the registry in not able or not operable to wake up the provider).

In the illustrated embodiment, the Service Registry performs various tests to ensure continued availability of a provider. The illustrated tests are exemplary and not presented in any particular order (in fact, in some embodiments, some or all of the tests may be performed simultaneously); it will be appreciated that other tests may be performed depending on the nature of the providers to be tested. It is assumed the tests are performed as separate or parallel threads/processes of execution, however, they may, of course, be performed sequentially. It will be further appreciated that not all illustrated tests need be performed for all service providers as some may be inapplicable to a particular service provider.

The Service Registry, by way of the watcher or directly, selects 400 a Service Provider known to the registry. The registry may test to determine if 402 the selected provider is alive. Liveliness may be tested in various ways. For example, in one embodiment the registry pings (e.g., sends an Internet Control Message Protocol (ICMP) packet) to the provider to determine whether the provider is accessible in the environment 110 (assuming it responds to ICMP packets). Alternatively, the registry may execute a dummy service invocation, or attempt to establish some kind of network communication session with the provider, or issue a wake-up instruction, etc. Or, for example, the registry may establish liveliness by talking to a management (hardware or software or combination thereof) module for that device. If 402 the selected 400 provider is not alive, then in one embodiment it is deleted 404 from the Service Registry database 120. In a further embodiment, a test is performed to determine if 418 deleted 404 providers should be added 420 to a check status list for later testing of availability and re-entry to the database. This allows the registry to optimize its answers to service request queries by removing, if only temporarily, "dead" entries before responding to service requests.

The Service Registry may test to determine if 406 an update has been received by or on behalf of the selected 400 provider. For example, as the status/state of a Service Provider changes, the provider may manually or automatically contact its Service Registry to inform it of the change. However, in addition to such voluntary updates, an update may be provided by a third party on behalf of the provider. For example, a Service Consumer may have requested a service in response to which a particular service provider was identified as able to perform the service. If the Service Consumer was unable to contact the identified Service Provider, the Service Consumer may notify the Service Registry of this problem, which in turn may result in the Service Registry removing the provider from the registry (if the reporting Service Consumer is trusted to be telling the truth) or may result in testing if 402 the Service Provider is alive. If an update has been received, the Service Registry revises 408 the status for the Service Provider accordingly, e.g., update the meta-data associated with the provider.

The Service Registry may query 410 a Service Provider for status updates. For example, a particular provider may not be configured to provide updates, or may be providing updates too infrequently. In such case the Service Registry may inspect and/or interrogate the Service Provider for current/ changes status data and revise 412 the status for the Service Provider accordingly, e.g., update the meta-data associated with the provider.

In addition to intelligent processing of the entries in the Service Registry database 120 based on monitoring of service providers themselves (or the environment or context in which the service provider resides), the Service Registry may also be configured to infer 414 the state of the selected 400 Service Provider. For example, the Service Registry may check power status (e.g., plugged in or expected battery life remaining), sleep status, as well as other environmental characteristics discussed above with respect to applying policies. Assume a Service Consumer queries the Service Registry for a particular service. If the Service Registry would normally identify Service Provider 104 to the Service Consumer, but the Service Registry is also aware that the last queried 410 update indicated that provider was at 5% battery life remaining 10 minutes ago, then the Service Registry may infer that Service Provider 104 is not presently available. As with determining 402 liveliness, the Service Provider 104 may be put on the check status list.

In one embodiment, assuming the Service Registry is embodied within one of the Service Providers, such as a portable notebook computer, the Registry/Provider may use information about its own power, connectivity, load level, network connectivity, security, etc to control services offered to other devices via its own private service registry. This usage applies in ad hoc networking conditions, as well as managed networks, and allows the Service Provider hosting the Service Registry to throttle services offered based on environment and internal state, and also avoids publishing of parameters/ state to external registries.

Figure 5:
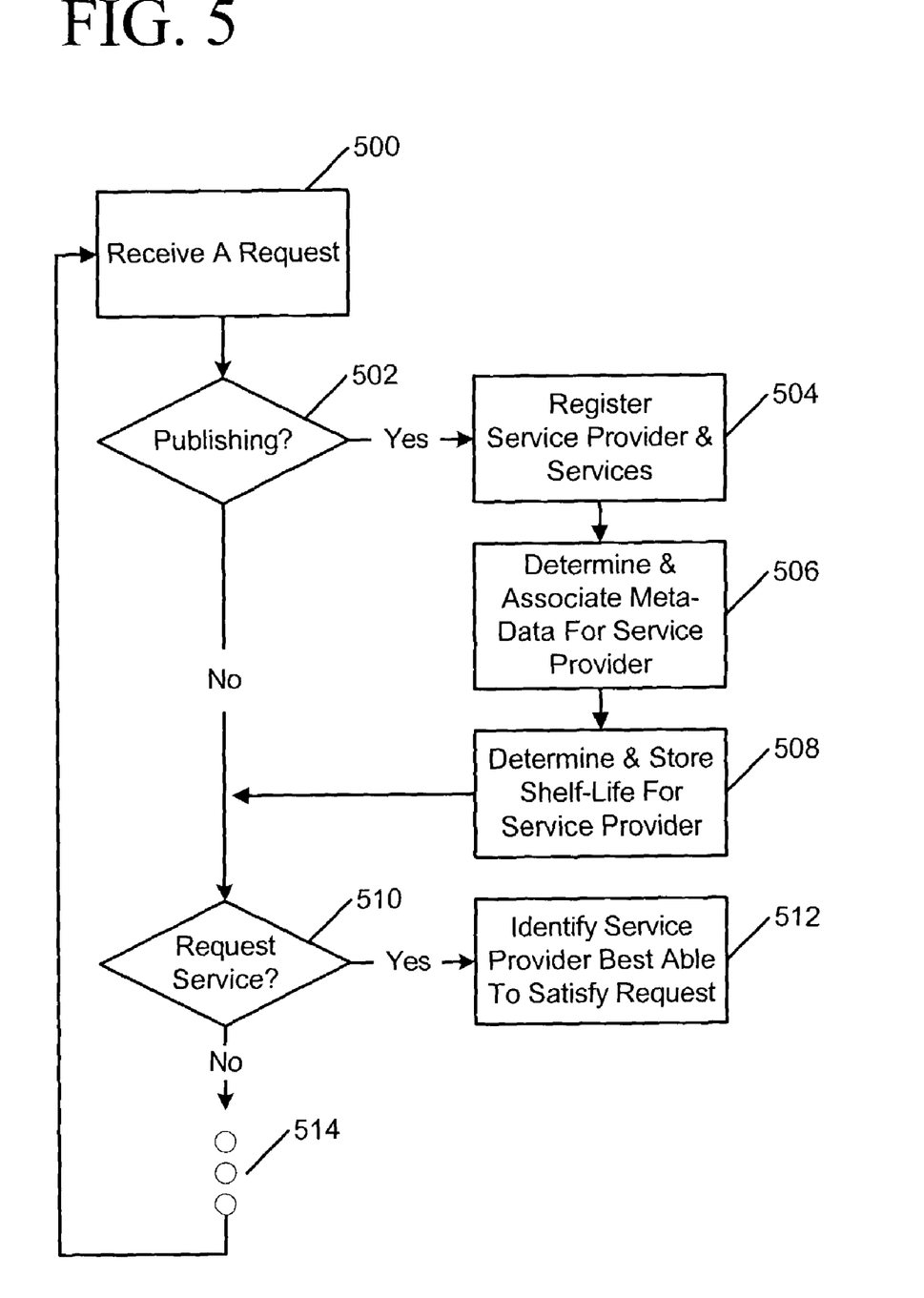
FIG. 5 illustrates a flowchart according to one embodiment for dynamically determining and associating a "shelf-life" to services published by Service Providers.

FIG. 5 illustrates a flowchart according to one embodiment for dynamically determining and associating a "shelf-life" to services published by Service Providers, such as transitory devices. In this illustrated embodiment, the shelf-life is associated with providers as they register with the Service Registry 100, however it will be appreciated that the Service Registry may be configured to later poll/inspect the Service Providers to determine or revise an existing expiration. The shelf-life attribute is much like a shelf-life used for products; that is, after expiration, the contents (published services) are deemed less appealing, and may in fact be thrown away (deregistered from the Service Registry database 120). The shelf-life is also similar to "soft-state" values in other areas of computer science.

When the Service Registry receives 500 a request, the registry determines what kind of request it has received, e.g., provider publication/registration, service consumer request, or some other request 514, and responds accordingly. If 502 a service provider is registering and publishing its offered services, the Service Registry registers 504 the provider and its published services as would a conventional registry. However, unlike a conventional registry, the Service Registry determines 506 and associates meta-data (discussed above) describing characteristics/capabilities of the registering provider. In addition, the Service Registry also determines 508 and stores a value, the shelf-life value, for how long the service is likely to be available, taking into account, for example direct and indirect information about the registering Service Provider.

Indirect shelf-life information includes information based on attributes or characteristics of a provider that may be used to infer a shelf-life, such as: type of device, e.g., handheld PDA (known to have a small battery, frequent "sleep mode" breaks, slower processor), cell phone (extremely resource-limited, but generally always-on/always-available), portable computer (many resources, potentially line-powered, etc.); the "mobility" or degree of transitory status of the provider, e.g. how easily may the provider leave the environment 110, whether the provider is seen to move around within the environment, the provider's current position/location/speed/acceleration/etc.; the power source of the provider, e.g. line-powered, battery-powered, amount of battery life remaining, the current CPU load of the provider, e.g. a laptop or desktop PC might be busy with a real-time sensitive computation for the owner and hence (to enforce local autonomy) the provider may not wish to publish anything except lightweight services; historical interaction between the Service Registry and the provider, e.g. the previous time the Service Registry encountered the provider, it was in the environment 110 for an hour, or the provider is always present here between 08:00 and 17:00 hours (on during "work hours"); how many other providers are nearby, e.g. a service on a disfavored (highly mobile, low power available, etc.) provider may have a lower-than-expected shelf if there are other alternative providers in the environment; and other time, space, activity, state and context information, including expected/predicted trajectories, may be used to determine the shelf-life.

In addition to indirect shelf-life information, direct shelf-life information may be used, such as includes hints given by (or queried from) the Service Provider to the Service Registry as it registered/published its services, e.g. the provider may indicate ability to offer a service for the next N (seconds|minutes|hours|etc.). In this example, the associated shelf-life might represent a compilation by the device of the other sources listed below.

Additionally, if available, the Service Registry can infer from other hints—e.g., in a conference room, if the registry has access to the device owner's calendar (either by querying the device, or by looking at a calendar server, etc.) it can intuit the likelihood of the device remaining available for some amount of time. In the case of a hotel, there could be inference from the check-out date, etc. In one embodiment, the shelf-life information can be augmented with a confidence value. Shelf-life information could also be augmented with additional metadata indicating various conditions such as a do not disturb, call back later (provider is present but do not bother it for another N seconds/minutes/hours/etc., but, after that, try again later.

Once the registry has assigned a shelf-life for the service, it can then take that value into account when returning the service provider in response to service request 510 query. In the most basic case, it can simply return the shelf-life and let the client determine whether or not to use a service from this provider. Or, it can order the results based entirely or in part on shelf-life. The central registry may use the shelf-life to evict or renew registration of those services. Similarly, a device can inspect the shelf-life of its own services, and renew its registration of those services accordingly.

Figure 6:
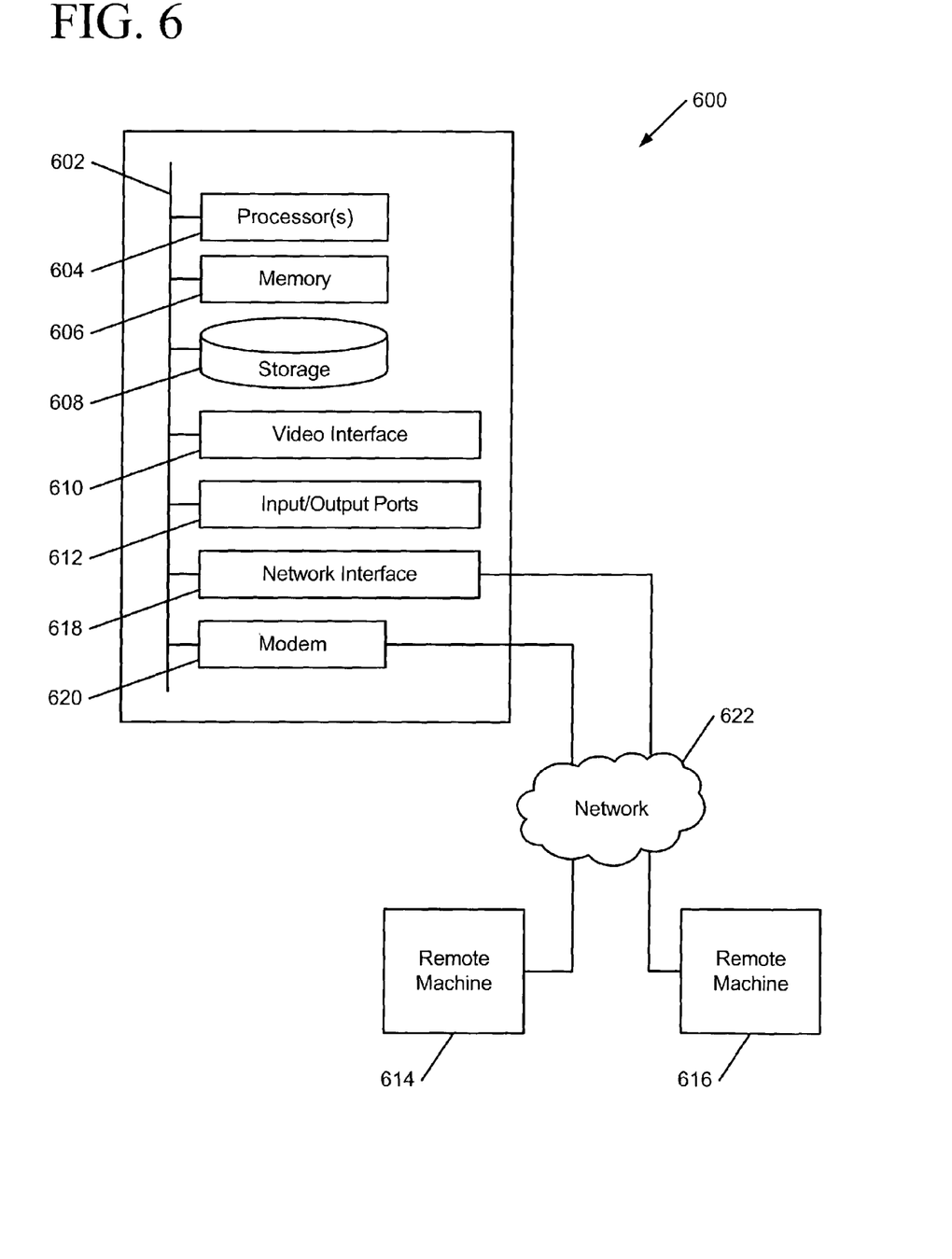
FIG. 6 illustrates a suitable computing environment in which certain aspects of the invention may be implemented.

FIG. 6 and the following discussion are intended to provide a brief, general description of a suitable environment in which certain aspects of the illustrated invention may be implemented.

As used herein below, the phrase "host machine" is intended to broadly encompass a single machine, or a system of communicatively coupled machines or devices operating together. Exemplary host machines include FIG. 1 physical devices 102, 104, 106, 108, as well as personal computers, workstations, servers, virtual machines, etc. It will be appreciated that one or more of devices 102-110 may be implemented as one or more virtual machines; the phrases "Service Registry," "Service Provider," "Service Consumer," etc. are intended to include these embodiment possibilities.

Typically, a host machine 600 includes a system bus 602 to which is attached processors 604, a memory 606, e.g., random access memory (RAM), read-only memory (ROM), or other state preserving medium, storage devices 608, a video interface 610, and input/output interface ports 612. The host machine and/or its virtual machines may be controlled, at least in part, by input from conventional input devices, such as keyboards, mice, etc., as well as by directives received from another machine, interaction with a virtual reality (VR) environment, biometric feedback, or other input source or signal.

The host machine may include embedded controllers, such as programmable or non-programmable logic devices or arrays, Application Specific Integrated Circuits, embedded computers, smart cards, and the like. The host machine and/or its virtual machines may utilize one or more connections to one or more remote machines 614, 616, such as through a network interface 618, modem 620, or other communicative coupling. The host machine and/or its virtual machines may be interconnected by way of a physical and/or logical network 622, such as the FIG. 1 network 114, which may include an intranet, the Internet, local area networks, wide area networks, etc. One skilled in the art will appreciated that communication with network 622 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by the host machine 600 and/or its virtual machines results in the host machine and/or its virtual machines performing tasks or defining abstract data types or low-level hardware contexts. Associated data may be stored in, for example, volatile and/or non-volatile memory 606, or in storage devices 608 and their associated storage media, including hard-drives, floppy-disks, optical storage, tapes, flash memory, memory sticks, digital video disks, biological storage, etc. Associated data may be delivered over transmission environments, including network 622, in the form of packets, serial data, parallel data, propagated signals, etc., and may be used in a compressed or encrypted format. Associated data may be used in a distributed environment, and stored locally and/or remotely for access by single or multi-processor machines.

Thus, for example, with respect to the illustrated embodiments, assuming host machine 600 embodies the Service Registry 100 of FIG. 1, then remote machine 614 may be one of the Service Providers 102-106 and a Service Consumer 108 seeking services offered by one of the Service Providers. It will be appreciated that remote machines 614, 616 may be include many or all of the elements discussed for machine 600, and that both transient devices and permanent devices may wish to advertise, discover, and provide/use services and resources of the other.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method comprising:
   receiving, by a host machine, a service request from one of a plurality of service consumer devices for a service, wherein the host machine includes a microprocessor, a random access memory, and a body configured to physically host the microprocessor and the random access memory;
   identifying, by the host machine, service providers registered with a service registry operated by the host machine to provide the requested service;

selecting, by the host machine, a service provider best able to provide the service from the identified service providers, wherein said selecting is based at least in part on meta-data associated with the identified service providers;

receiving, by the host machine, notification from at least the one of the plurality of service consumer devices about unavailability of one of the identified service providers;

determining, by the host machine, that the one of the plurality of service consumer devices is trusted;

de-registering, by the host machine, the unavailable identified service provider from the service registry responsive to said receiving of notification from the one of the plurality of service consumer devices that is trusted; and adding the de-registered service provider to a check status list for later testing for availability.

2. The method of claim 1, wherein said meta-data associated with registered service providers comprises an identification of energy available thereto, and wherein said selecting is based on service provider energy availability.

3. The method of claim 1, further comprising: querying, by the host machine, the registered service provider for updated meta-data for the registered service provider.

4. The method of claim 1, further comprising:
receiving, by the host machine, a publication from the service provider for at least services offered by the service provider;
registering, by the host machine, the service provider;
determining, by the host machine, for each service provider registration, meta-data describing characteristics of the service provider;
associating, by the host machine, the meta-data with said registration of the service provider.

5. The method of claim 4, further comprising: receiving from the service provider, by the host machine, at least meta-data of the service provider, when receiving the publication from the service provider.

6. The method of claim 1, wherein the service registry is a UDDI registry.

7. The method of claim 1, further comprising: associating, by the host machine, a shelf-life with service provider registrations.

8. An article of manufacture comprising:
tangible non-transitory machine-accessible media; and
a plurality of programming instructions stored on the machine-accessible media and configured to program a host machine having a processor and a memory, and enable the host machine, in response to execution of the instructions by the host machine, to service a plurality of service consumer devices, including performing operations to
receive a service request from one of the service consumer devices for a service;
identify service providers registered with a service registry operated by the host machine to provide the requested service;
select a service provider best able to provide the service from the identified service providers, wherein said selecting is based at least in part on meta-data associated with the identified service providers;
identify said selected service provider to the one of the service consumer devices;
receive notification from at least the one of the service consumer devices about unavailability of one of the identified service provider;
determine that the one of the service consumer devices is trusted;
de-register the unavailable identified service provider from the service registry responsive to said receiving of notification from the one of the service consumer devices that is trusted; and
add the de-registered service provider to a check status list for later testing for availability.

9. The article of claim 8, wherein performing operations further include performing operations to
receive a publication from the service provider for at least services offered by the service provider;
register the service provider;
determine for each service provider registration, meta-data describing characteristics of the service provider;
associate the meta-data with said registration of the service provider.

10. A host machine for servicing a plurality of service consumer devices, comprising:
a microprocessor;
a random access memory coupled to the microprocessor,
a body configured to physically host the microprocessor and the random access memory;
and
logic operated by the processor and adapted to
receive a publication from one or more service providers configured to offer a service;
register the one or more service providers with a service registry operated by the host machine;
determine, for each service provider registration, meta-data describing characteristics of the one or more service providers;
associate the meta-data with the one or more service providers;
receive a service request from one of the service consumer devices for the service offered by the one or more service providers,
identify the one or more service providers;
select one of the one or more service providers best able to provide the service, wherein said selecting is based at least in part on said meta-data associated with the one or more service providers;
receive notification from at least the one of the service consumer devices about unavailability of one of the one or more service providers;
determine that the one of the service consumer devices is trusted;
de-register the unavailable identified service provider from the service registry responsive to said receiving of notification from the one of the service consumer devices that is trusted; and
adding the de-registered service provider to a check status list for later testing for availability.

11. The host machine of claim 10, wherein the logic is further adapted to apply policies to meta-data of registered service providers to facilitate said selecting the service provider best able to provide for the particular service request.

* * * * *